United States Patent [19]

Maeda

[11] Patent Number: 4,947,472
[45] Date of Patent: Aug. 7, 1990

[54] IMAGE FORMING APPARATUS WITH ROLL-TYPE RECORDING MATERIAL

[75] Inventor: Yutaka Maeda, Osaka, Japan

[73] Assignee: Minolta Camera Kabushiki Kaisha, Osaka, Japan

[21] Appl. No.: 238,820

[22] Filed: Aug. 31, 1988

[30] Foreign Application Priority Data

Aug. 31, 1987 [JP] Japan .................. 62/133361[U]

[51] Int. Cl.⁵ .............................................. G03B 27/58
[52] U.S. Cl. ..................................... 355/72; 200/61.16
[58] Field of Search ............................. 355/72, 73, 74; 200/61.15, 61.16, 61.17; 242/57

[56] References Cited

U.S. PATENT DOCUMENTS 3,519,213  7/1970  Hofmann et al. ............... 200/61.16
4,422,402  12/1983  Ogihara ......................... 200/61.15

FOREIGN PATENT DOCUMENTS 59-68748  5/1984  Japan.

Primary Examiner—Michael L. Gellner
Assistant Examiner—Khanh Dang
Attorney, Agent, or Firm—Wenderoth, Lind & Ponack

[57] ABSTRACT

An image forming apparatus for forming images on a roll of recording material, comprising a case accommodating the roll of recording material which is drawn out therefrom. A movable member is disposed within the case and is movable in accordance with the decrease of the radius of the roll. A detectable member attached to the movable member and a detecting member provided outside of the case are for detecting that the detectable member has been brought to a predetermined position by the movement of the movable member when the radius of the roll has reached a predetermined value. The movable member has a length permitting the forward end of the member to move away from the outermost surface of the roll when the radius of the roll has reached the predetermined value.

22 Claims, 7 Drawing Sheets

IMAGE FORMING APPARATUS WITH ROLL-TYPE RECORDING MATERIAL

BACKGROUND OF THE INVENTION

Field of the Invention

The present invention relates to image forming apparatus for use with a roll of paper, and more particularly to such an apparatus wherein a roll of paper as accommodated in a case is used for forming images thereon and which is adapted to indicate the amount of paper remaining in the case.

Description of the Prior Art

Roll-type photosensitive materials such as film, photographic paper and the like for use in image exposing apparatus are accommodated in light-tight cases so as to be handleable in a lighted room despite their photosensitivity. The roll-type photosensitive material is used with the case mounted in the main body of the exposing apparatus. Such a roll-type photosensitive material is accommodated in the case by the user, or is available as accommodated by the manufacturer in a disposable case which is to be discarded after the material has been used up. To reduce cost, the disposable case has a very simple construction and is generally made of paper or the like.

When a case in use, and still containing a quantity of roll-type photosensitive material, is to be replaced by another case to use a different kind of photosensitive sensitive material contained therein, the user must accurately determine the amount of remaining material. The need to detect the remaining amount arises, for example, because if a case with only a very small amount of remaining photosensitive material is used for making a plurality of copies by a continuous image forming operation, it is likely that the case will run out of the material before the desired number of copies are obtained. Nevertheless, it is impossible to accurately recognize the amount of the remainder from outside the light-tight case accommodating the material to prevent the deterioration thereof. A weighing scale, if employed, of course accurately indicates the amount, but it is then necessary to prepare the weighing scale and to remove the case from the apparatus body before the measurement, hence a cumbersome procedure.

SUMMARY OF THE INVENTION

The main object of the present invention is to provide an image forming apparatus having a simple construction for accurately detecting the remaining amount of a roll-type recording material.

Another object of the invention is to provide an image forming apparatus which has in its main body a mount portion for supporting thereon a case accommodating a roll of recording material and which is adapted to accurately contactlessly detect the recording material in the case without providing any electrical or mechanical point of contact between the case and the mount portion.

These and other objects of the present invention can be fulfilled by providing an image forming apparatus which comprises a case accommodating a roll of recording material, a mount portion for removably supporting the case thereon, a movable member disposed within the case and movable in accordance with the radius of the roll of recording material, the movable member having a length permitting the forward end of the member to move away from the outermost surface of the roll when the radius of the roll has reached a predetermined value, a detectable member attached to the movable member, and detecting means provided on the mount portion for detecting that the detectable member has been brought to a predetermined position by the movement of the movable member.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
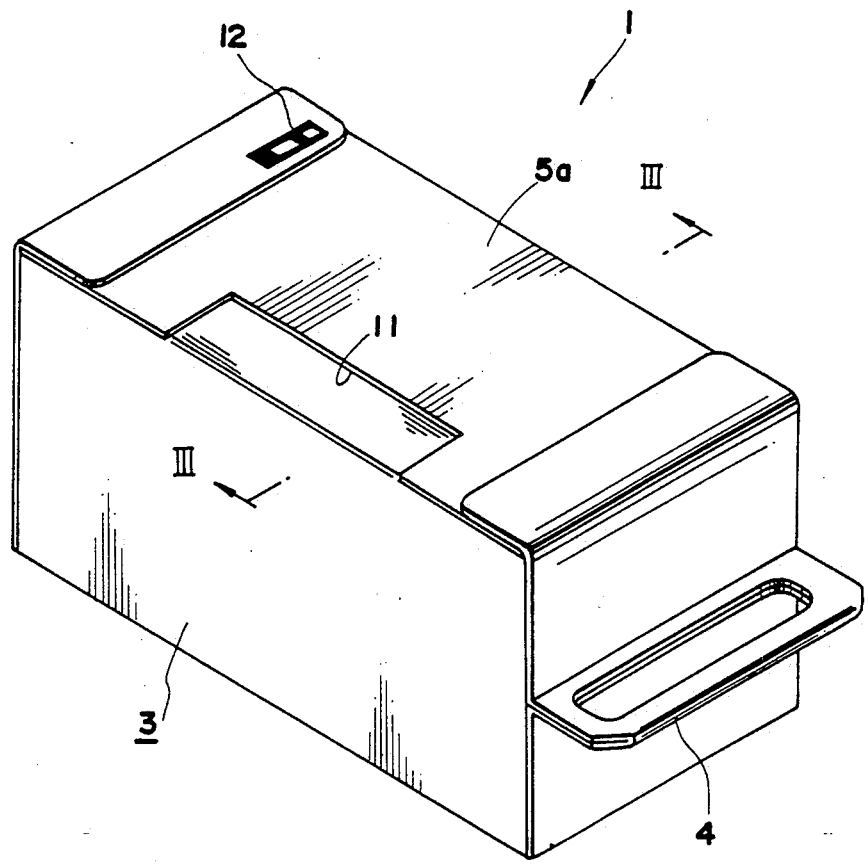
FIG. 1 is a perspective view of a case for use in an image forming apparatus embodying the invention.
Figure 2:
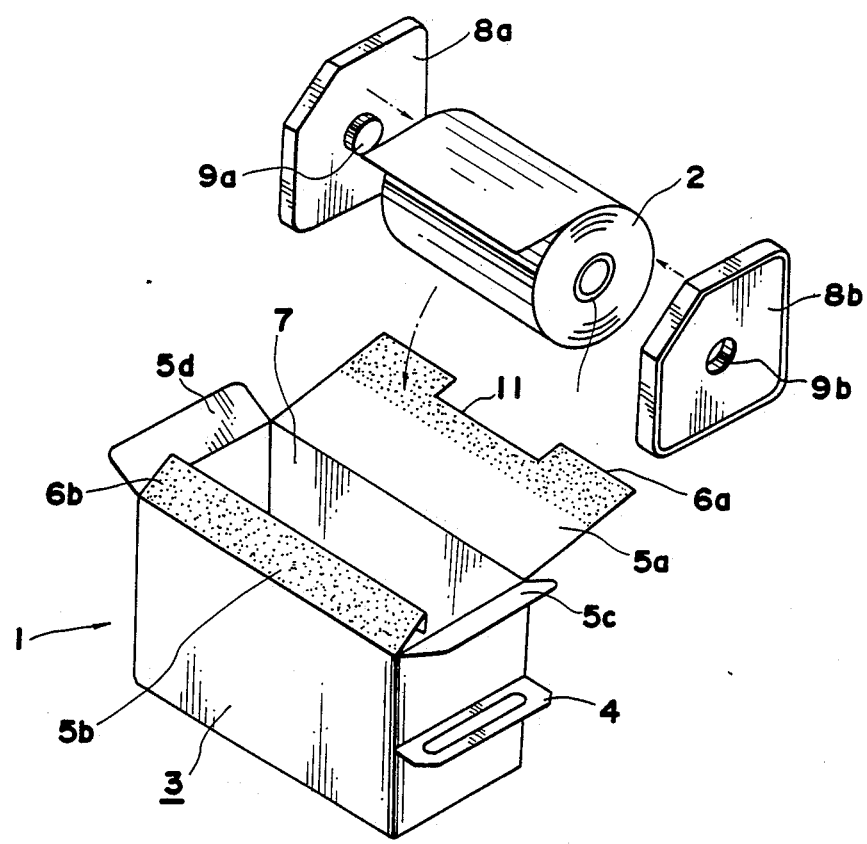
FIG. 2 is an exploded perspective view showing how a roll of photosensitive material is accommodated in the case.

FIG. 1 is a perspective view of a case 1 having a roll of photosensitive material 2 accommodated therein for use in an image forming apparatus embodying the invention, and FIG. 2 is an exploded perspective view showing how the roll of photosensitive material 2 is accommodated in the case 1. The case (hereinafter referred to as a "magazine") 1 is made of a corrugated board or the like and comprises a box-shaped body 3, and a knob 4 attached to one end of the body 3 for use in carrying the magazine. Four upper flaps 5a, 5b, 5c and 5d are foldably provided at the upper edge of the body 3. The flap 5a has flocked paper 6a affixed to its inner surface, while the outer surface of the flap 5b to be opposed to the flap 5a has flocked paper 6b affixed thereto. When the flap 5a is folded over the flap 5b to close the upper opening 7 of the body 3, the flocked paper 6a is in intimate contact with the flocked paper 6b, whereby light is prevented from penetrating into the magazine 1 from outside to preclude the photosensitive material 2 from deterioration due to the external light. Of the upper flaps 5a to 5d, the flaps 5a and 5b opposed to each other and lapping over each other along the direction in which the photosensitive material 2 is paid off define a passage S for the material 2 (see FIG. 3). The flap 5a on the upper side is centrally formed with a cutout 11 to provide a space through which a pay-off roller 31 acts on the material 2.

The body 3 houses the roll of photosensitive material 2, and support members 8a, 8b for rotatably supporting the roll 2. The support members 8a, 8b have projecting studs 9a, 9b, respectively, fitting in a core 10 having the material 2 rolled up thereon, whereby the roll 2 is made freely rotatable. When it is to be accommodated in the magazine 1, the roll 2 as rotatably supported by the support members 8a, 8b, is placed into the magazine 1, and the upper flaps 5a, 5b, 5c and 5d are thereafter folded to close the upper opening 7. The magazine 1 is installed in the main body of the image forming apparatus, and the leading end of the material 2 is pulled out through the passage S. The roll of material 2 is then ready for use.

There are two kinds of roll-type photosensitive materials, i.e. film and photosensitive paper, each of which is available in several different widths. The body 3 of the magazine 1 has a sheet 12 affixed thereto which identifies the kind of photosensitive material 2 contained therein.

Figure 3:
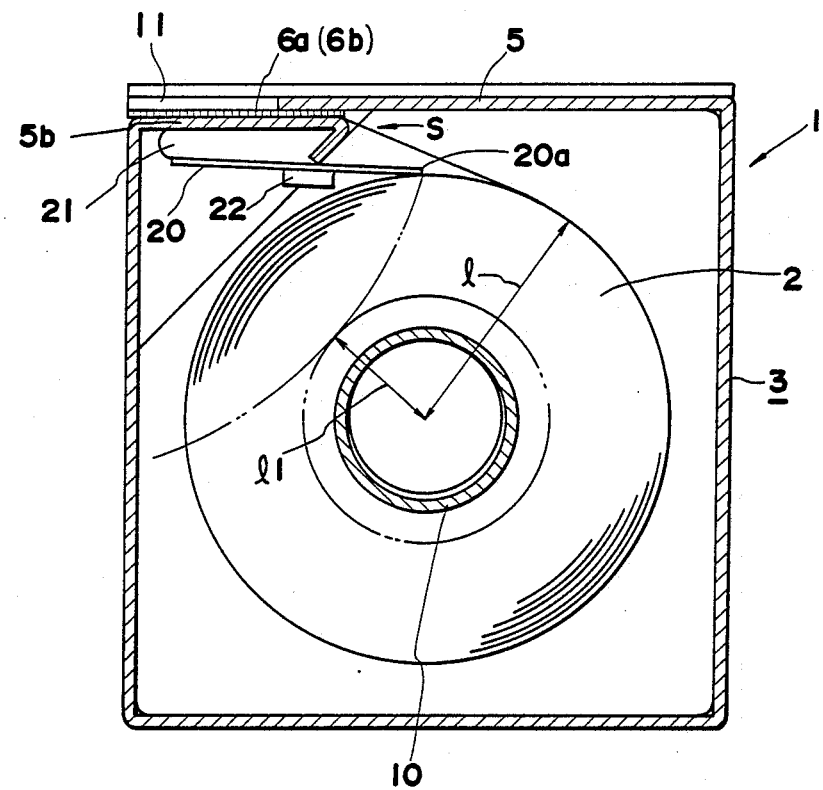
FIG. 3 is a view in section taken along the line III—III in FIG. 1.
Figure 4:
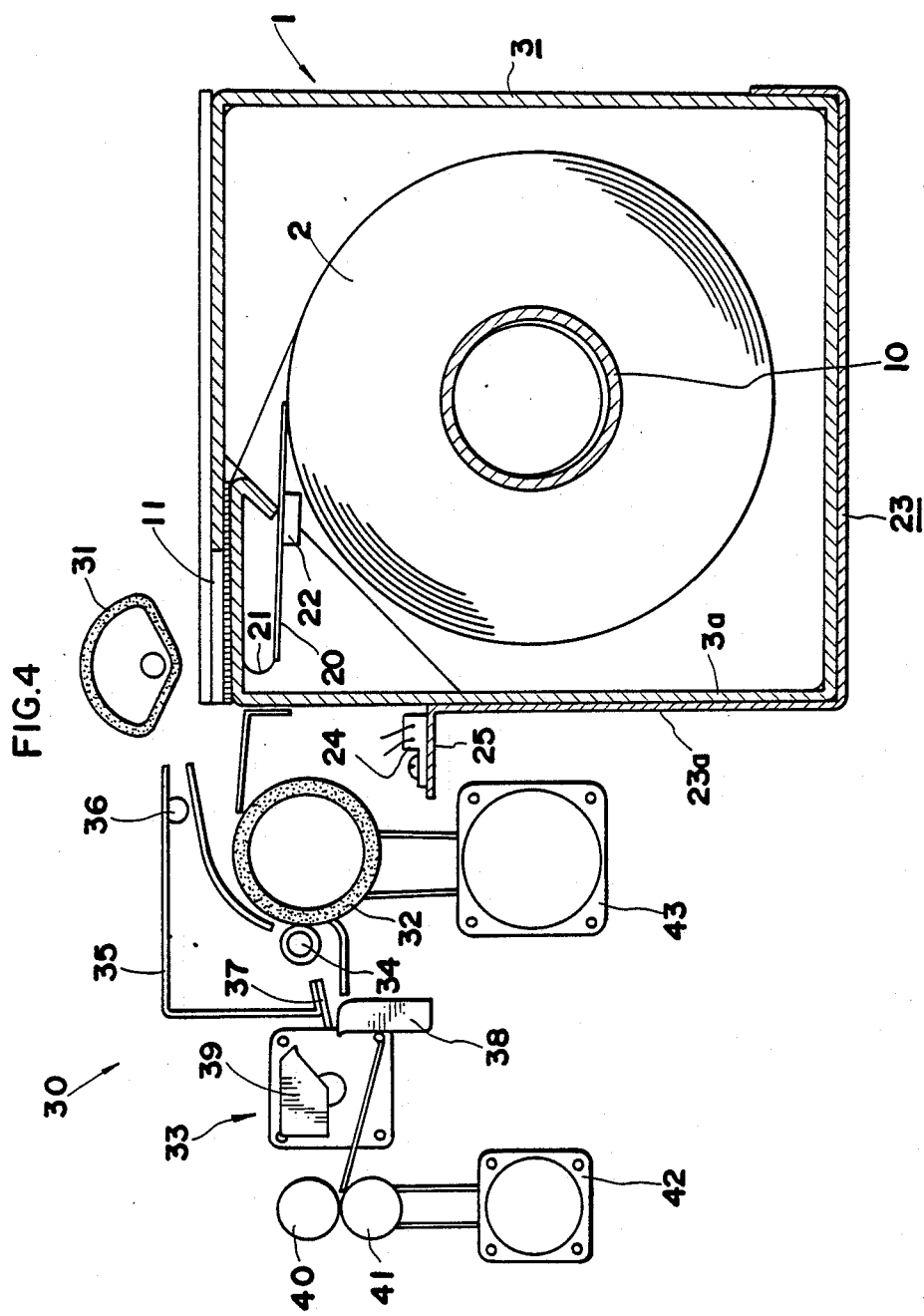
FIG. 4 is a sectional view showing the case as installed in the main body of the apparatus.
Figure 5:
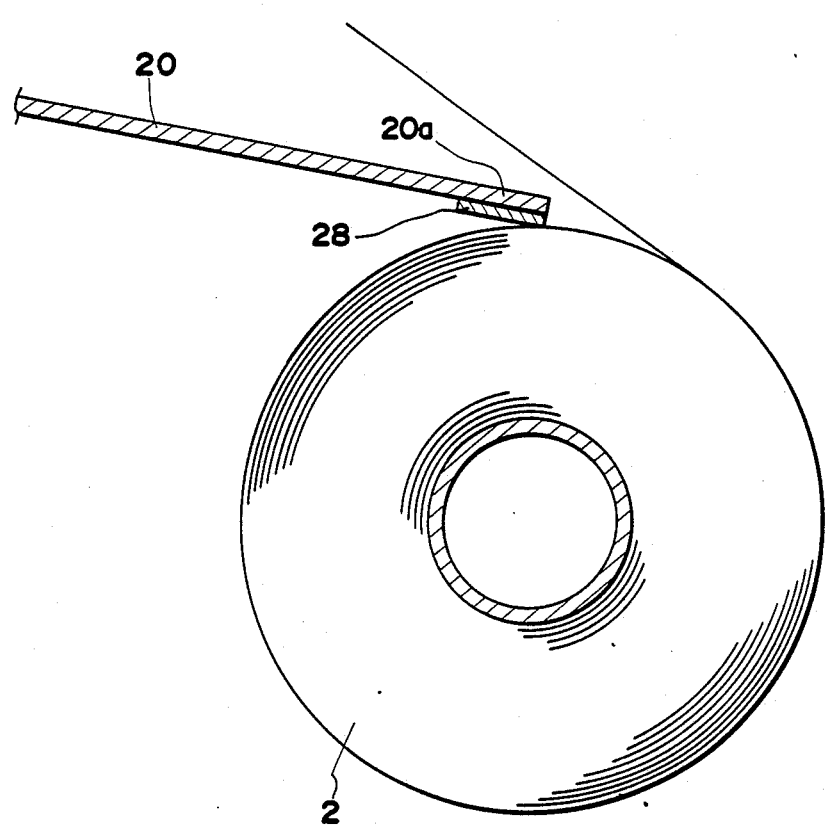
FIG. 5 is an enlarged view showing a movable member.

FIG. 3 is a view in section taken along the line III—III in FIG. 1, and FIG. 4 is a sectional view showing the magazine as installed in the main body of an image exposing unit included in the apparatus. Disposed within the magazine 1 is a movable member 20 which is shiftable with a reduction in the radius of roll of the photosensitive material 2. The movable member 20 has one end in contact with the outer surface of the roll 2 and the other end attached to one end of a plate spring 21. The other end of the plate spring 21 is positioned close to the front wall (left side wall in FIG. 3) 3a of the magazine 1 and secured to the lower surface of the magazine flap 5b. Accordingly, the force of the spring 21 biases the movable member 20 clockwise in FIG. 3 about the spring 21. The length of the movable member 20 is so determined that the forward end 20a of the member 20 moves away from the outer peripheral surface of the roll 2 when the radius l of the roll 2 has reduced to a radius l1 corresponding to a predetermined remaining amount of photosensitive material 2 as the material is used. As seen in FIG. 5, the surface of the forward end 20a of the movable member 20 in contact with the roll 2 has affixed thereto cloth 28 or the like for protecting the photosensitive material from damage due to the contact. With reference FIG. 3, a permanent magnet 22 serving as a detectable piece is secured to the lower surface of the movable member 20.

The image exposing unit has a mount portion 23 for supporting the magazine 1 thereon with the front wall 3a positioned toward the front (leftward in FIG. 4). The mount portion 23 has a left side wall 23a provided with a flange 25 at its upper end. Mounted on the flange 25 is a reed switch 24 serving as detecting means and adapted to be actuated by the approach of the permanent magnet 22. The reed switch 24 is so positioned as to oppose the permanent magnet 22 when the magnet 22 is brought into contact with the front wall 3a of the magazine 1 by being angularly shifted by the force of the plate spring 21.

The rolled-up photosensitive material 2 accommodated in the magazine 1 is pulled out through the cutout 11 and cut to a specified length by a cutting device 30. The cutting device 30 comprises the aforementioned pay-off roller 31 having a sectorial cross section and disposed above the cutout 11, a feed roller 32 for sending out the material 2 by the required length, cutter means 33, etc. FIG. 4 further shows a pressure roller 34 in pressing contact with and rotatable by the feed roller 32 for delivering the material 2 to the cutter means 33, and a frame 35 movable about a pivot 36 and provided at its forward end with a holding plate 37 for holding the leading end of the photosensitive material 2. The cutter means 33 comprises a stationary blade 38 and a movable blade 39. Also illustrated are transport rollers 40 and 41 for transporting the cut-off sheet of material 2. The transport roller 40 is drivingly rotated by a motor 42, and the feed roller 32 by a motor 43.

Figure 6:
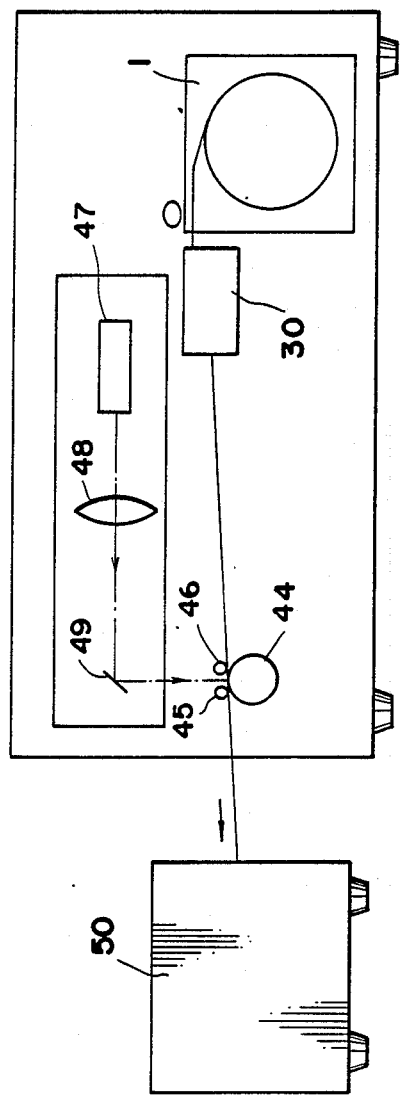
FIG. 6 is a diagram showing an image exposing unit in its entirety.

FIG. 6 shows the image exposing unit in its entirety. The photosensitive material 2 paid off from the magazine 1 is cut to the specified length by the cutting device 30 and fed onto a rotatable drum 44. The light from a light source 47 is passed through a lens 48, reflected at a reflecting mirror 49 and projected on the drum 44 at an exposure position between a pair of guide rollers 45, 46 rotatable by pressing contact with the drum 44, whereby the cut-off sheet of photosensitive material 2 is exposed to the light between the guide rollers 45, 46. The exposed sheet is fed, for example, to a developing unit 50 and developed.

The apparatus having the foregoing construction operates as follows to detect the remaining amount of rolled-up photosensitive material 2.

Figure 7:
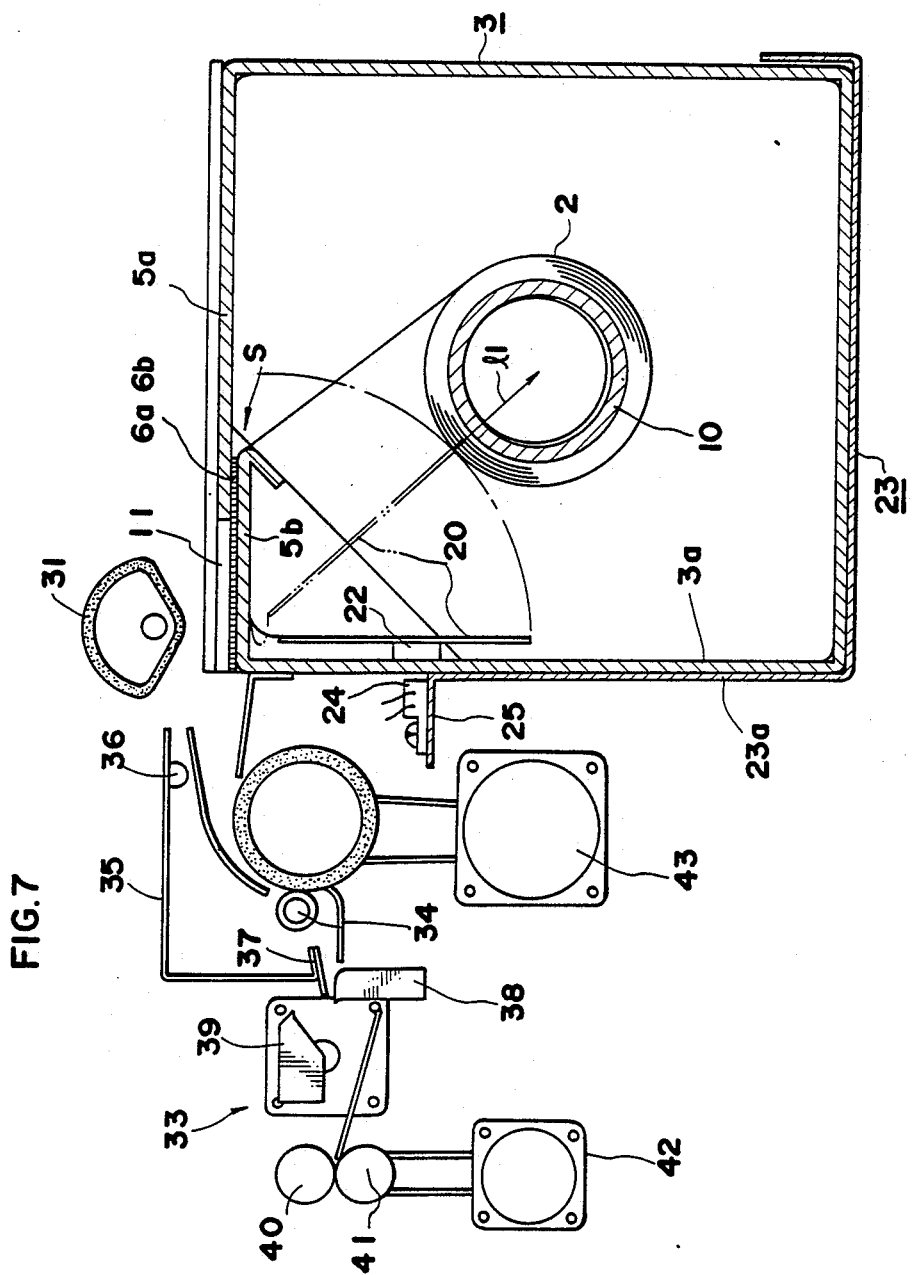
FIG. 7 is a sectional view showing the movable member as positioned when the radius of the roll of photosensitive material has been reduced to a predetermined value.

The radius of roll of the photosensitive material 2 in the magazine 1 installed in the main body of the apparatus gradually decreases as the material is used. With this decrease, the movable member 20 is angularly shifted clockwise by the force of the plate spring 21 while sliding on the outer periphery of the roll 2. Upon the radius decreasing to the predetermined value l1, the forward end 20a of the movable member 20 moves away from the outer peripheral surface of the roll as indicated in phantom line in FIG. 7. Consequently, the movable member 20 angularly shifts toward the inner surface of the front wall 3a of the magazine 1, bringing the permanent magnet 22 into contact with the wall inner surface as seen in FIG. 7, whereupon the member 20 stops. At this time, the reed switch 24 is magnetically brought into conduction by the magnet 22, thus detecting that the amount of remaining photosensitive material 2 has reached the specified value. In this way, it is possible to detect that the remaining amount of rolled-up photosensitive material has reached the specified value contactlessly without providing any electrical or mechanical point of contact between the magazine 1 and the apparatus main body. The actuation of the reed switch 24 is indicated by an LED or the like and causes a buzzer or the like to give off an alarm sound, enabling the user to execute an appropriate image forming operation in accordance with the remaining amount in view of the number of copies to be made and the size in which the photosensitive material 2 is to be cut.

The remaining amount of rolled-up photosensitive material 2 for actuating the reed switch 24 is variable by altering the length of the movable member 20. Although the permanent magnet 22 and the reed switch 24 are adapted to detect the remaining amount in the foregoing embodiment, an iron piece is usable as the detectable piece in combination with a capacitance sensor serving as the detecting means. Instead of using the plate spring 21, the movable member 20 may be made shiftable under gravity to bring the permanent magnet 22 into contact with the inner surface of the front wall 3a.

Also useful is the combination of a plurality of movable members different from one another in length and reed switches equal in number to the number of the members for detecting the decrease in the radius of roll stepwise.

The embodiment described above is adapted for use with a roll of photosensitive material, but even when the roll of material contained in the magazine is not photosensitive, the remaining amount of material can be similarly detected contactlessly accurately.

Seemingly, the movable member 20 which is disposed in the left upper corner of the magazine 1 in the above embodiment may be provided alternatively in the right corner. However, the sensitive material 2 will then warp when rewound, making it impossible to accurately detect the remaining amount. The movable member 20 of the invention, which is provided in the left upper corner, is free of this problem.

To sum up, the amount of rolled-up material remaining in its case can be contactlessly detected properly according to the invention without providing any electric or mechanical point of contact between the case and the mount portion therefor. This makes the interior construction of the case simpler than in the prior art to realize a highly reliable detecting device at a reduced production cost.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In an image forming apparatus for forming images on a roll of recording material, an apparatus for detecting when the radius of said roll of recording material has reached a predetermined value, said apparatus comprising:
    a case accommodating said roll of recording material for having said recording material drawn out therefrom;
    a mount portion for removably supporting said case thereon;
    a movable member movably disposed within said case, said movable member having means for spring-biasing said member against the outermost surface of said roll so that said movable member is movable in accordance with changes in the radius of said roll, said movable member having a length permitting the forward end of said member to move away from the outermost surface of said roll when the radius of said roll reaches a predetermined value;
    a detectable member attached to said movable member; and
    a detecting means provided on said mount portion for detecting that said detectable member has been brought to a predetermined position by movement of said movable member.

2. An image forming apparatus as claimed in claim 1 wherein said detecting means is a reed switch and said detectable means is a magnet.

3. In an image forming apparatus for forming images on a roll of recording material, an apparatus for detecting when the radius of said roll of recording material has reached a predetermined value, said apparatus comprising:
    a case accommodating said roll of recording material such that said recording material can be drawn out therefrom;
    a mount portion for removably supporting said case thereon;
    a movable member movably disposed within said case such that said member is movable in accordance with changes in the radius of said roll;
    a detectable member attached to said movable member; and
    a detecting means provided on said mount portion for detecting that said detectable member has been brought to a predetermined position by movement of said movable member.

4. An image forming apparatus as claimed in claim 3, wherein said movable member contacts said roll, and has a length permitting the forward end of said member to move away from the outermost surface of said roll when the radius of said roll has reached a predetermined value.

5. An image forming apparatus as claimed in claim 3, and further comprising means for spring-biasing said movable member against the surface of said roll.

6. An image forming apparatus as claimed in claim 3, wherein said detecting means is a reed switch and said detectable means is a magnet.

7. An image forming apparatus as claimed in claim 3, wherein said recording material has photosensitivity.

8. In an image forming apparatus for forming images on a recording material, an apparatus comprising:
    a case accommodating said recording material such that said recording material can be drawn out therefrom;
    a mount portion for removably supporting said case thereon;
    a movable member movably disposed within said case such that said member is movable in accordance with a decrease in the amount of said recording material;
    a detectable member attached to said movable member; and
    a detecting means provided on said mount portion for detecting that said detectable member has been brought to a predetermined position by movement of said movable member.

9. An image forming apparatus as claimed in claim 8, wherein said movable member contacts said recording material, and has a length permitting the forward end of said movable member to move away from the outermost surface of said recording material when the amount of the recording material has reached said predetermined value.

10. An image forming apparatus as claimed in claim 11, and further comprising means for spring-biasing said movable member against the surface of said recording material.

11. An image forming apparatus as claimed in claim 8, wherein said detecting means is a reed switch and said detectable means is a magnet.

12. An image forming apparatus as claimed in claim 8, wherein said recording material has photosensitivity.

13. An apparatus for detecting the remaining amount of a rolled material, said apparatus comprising:
    a case accommodating said rolled material such that said rolled material can be drawn out therefrom;
    a mount portion for removably supporting said case thereon;
    a movable member movably disposed within said case such that said member is movable in accordance with changes in the radius of said rolled material;
    a detectable member attached to said movable member; and a detecting means provided on said mount portion for detecting that said detectable member has been brought to a predetermined position by movement of said movable member.

14. An apparatus as claimed in claim 13, wherein said movable member contacts said rolled material and, has a length permitting the forward end of said member to move away from the outermost surface of said rolled material when the radius of said rolled material reaches a predetermined value.

15. An image forming apparatus as claimed in claim 16, and further comprising means for spring-biasing said movable member against the surface of said rolled material.

16. An apparatus as claimed in claim 13, wherein said detecting means is a reed switch and said detectable means is a magnet.

17. An apparatus as claimed in claim 13, wherein said rolled material has photosensitivity.

18. An apparatus for detecting a remaining amount of a material, said apparatus comprising:
- a case accommodating said material such that said material can be drawn out therefrom;
- a mount portion for removably supporting said case thereon;
- a movable member movably disposed within said case such that said member is movable in accordance with the decrease of said material;
- a detectable member attached to said movable member; and
- a detecting means provided on said mount portion for detecting that said detectable member has been brought to a predetermined position by movement of said movable member.

19. An apparatus as claimed in claim 18, wherein said movable member contacts said material, and has a length permitting the forward end of said member to move away from the outermost surface of said material when the amount of said material has reached a predetermined value.

20. An image forming apparatus as claimed in claim 18, and further comprising means for spring-biasing said movable member against the surface of said material.

21. An apparatus as claimed in claim 18, wherein said detecting means is a reed switch and said detectable means is a magnet.

22. An apparatus as claimed in claim 18, wherein said material has photosensitivity.

* * * * *